May 19, 1964
R. GAUTHIER ETAL
3,133,407
POWER PLANTS COMPRISING AN INTERNAL COMBUSTION ENGINE
PROVIDED WITH A GOVERNOR AND A VARIABLE
RATIO TRANSMISSION
Filed June 24, 1963
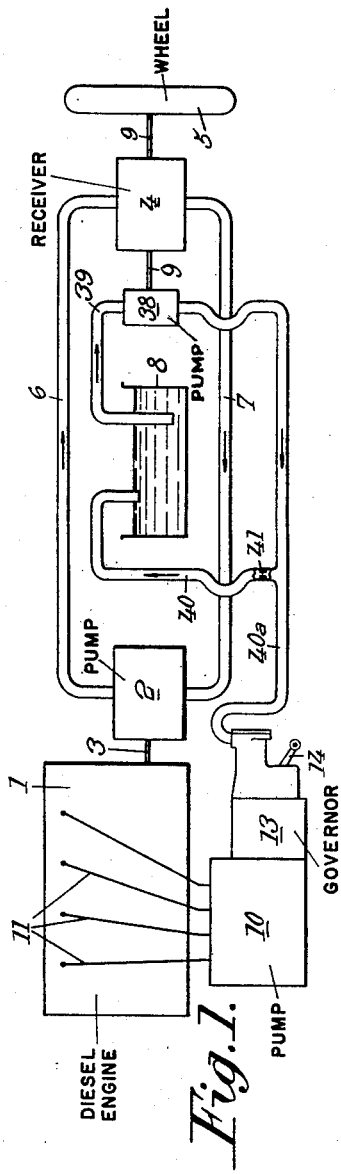
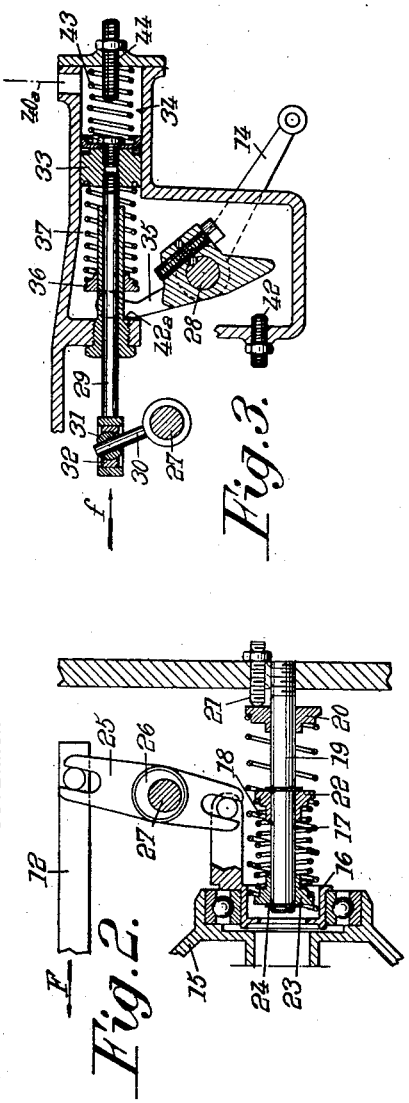
INVENTORS
ROBERT GAUTHIER
JEAN PIGEROULET
BY Bailey, Stephenson
Huettig
ATTORNEYS 3,133,407
POWER PLANTS COMPRISING AN INTERNAL COMBUSTION ENGINE PROVIDED WITH A GOVERNOR AND A VARIABLE RATIO TRANSMISSION
Robert Gauthier, Saint-Germain au Mont d'Or, and Jean Pigeroulet, Lyon, France, assignors to Societe Industrielle Generale de Mecanique Appliquee S.I.G.M.A., Paris, France, a society of France
Filed June 24, 1963, Ser. No. 289,964
Claims priority, application France June 26, 1962
2 Claims. (Cl. 60—19)

The present invention relates to power plants comprising an internal combustion engine provided with a governor and a transmission the ratio of which is variable, preferably in a continuous manner, in particular a hydraulic transmission, interposed between said engine and a part to be driven. The invention is more especially but not exclusively concerned with power plants to be mounted on automobile vehicles the above mentioned part to be driven being then a wheel or a set of wheels.

It is known that, in power plants of the above stated type such as they exist at the present time, the usual throttle control (generally operated by means of a pedal) acts directly upon the governor in such manner that to a given position of the throttle control there corresponds substantially a given speed of the engine. As the transmission is a variable ratio transmission, the part to be driven can thus have any speed whatever for a given position of the throttle control, which is particularly disturbing in the case of a transmission the ratio of which is determined independently of the driver.

The chief object of the present invention is to obviate this drawback.

The invention consists chiefly, in such a power plant, in placing the governor under control of a movable element which is subjected to the action of two forces. One of these forces, acting in the direction corresponding to an acceleration of the engine, is a resilient force applied by the throttle control. The other of these forces, acting in the opposed direction, is a force varying in the same direction as the speed of the part to be driven. The whole is arranged in such manner that, for a given position of the throttle control, the variations of speed of the part to be driven which tend to take place under the effect of a change of the ratio of transmission are automatically eliminated, or at least reduced, by corresponding variations of the speed of the engine under the action of the governor influenced by the second of said forces.

Other features of the present invention will be hereinafter disclosed in the following description of a preferred embodiment of the invention, given with reference to the appended drawings wherein:

FIG. 1 diagrammatically shows, with parts in cross section, a power plant made according to the invention;

FIGS. 2 and 3 are sectional views on an enlarged scale, in two parallel planes respectively, of a portion of FIG. 1.

In the following description it will be supposed that the invention is applied to a power plant for an automobile vehicle. This power plant essentially comprises a diesel internal combustion engine 1 and a hydraulic transmission comprising a pump 2 driven by the shaft 3 of said engine and a hydraulic receiver 4 mechanically coupled with a wheel 5 of the vehicle, a delivery conduit 6 and a return conduit 7 being disposed so as to form a closed circuit between pump 2 and receiver 4. The normal direction of flow of the control liquid is indicated by arrows in FIG. 1. Loss of liquid by leaks may be compensated by liquid fed from a reservoir 8.

In order to obtain a variable ratio transmission, pump 2, (or possibly receiver 4) is arranged in such manner that the volume of liquid delivered by said pump 2 (or received by said receiver 4) on every revolution of driving shaft 3 (or driven shaft 9) can be varied, in a manner well known in the art, and illustrated for instance in the copending application Ser. No. 289,965 filed of even date for "Improvements in Variable Ratio Hydraulic Transmissions."

Diesel engine 1 is fed with fuel from an injection pump 10 through pipes 11. The flow rate of pump 10 is adjusted by a rack 12 which, when moved in the direction of arrow F (FIG. 2), reduces this flow rate.

The means for moving rack 12 comprises a governor 13 (FIG. 1) and a throttle control including a lever 14 (FIG. 3), the displacement of this lever being limited by an adjustment screw 42 and an abutment $42_a$.

Governor 13, advantageously of the centrifugal type, is driven by the shaft of pump 10. It comprises a rotary member 15 (FIG. 2) which transmits to a disc 16, slidable axially but not rotatable, a thrust (toward the right in the construction of FIG. 2) the value of which increases when the number of revolutions per minute of engine 1 increases and which decreases when said number of revolutions decreases.

This thrust is balanced, for idling speeds of engine 1, by the action of a spring 17, and, for normal running conditions, by the combined actions of said spring 17 and another spring 18. Both of these springs are disposed about a fixed rod 19. Spring 17 is interposed between disc 16 and a fixed ring 20 the position of which is adjustable by means of a rod 21 screwed in the frame of the plant. Spring 18 is interposed between a fixed ring 22 secured to rod 19 and a ring 23 slidable along said rod 19 but the displacements of which toward the left are limited by an abutment 24.

When engine 1 passes from idling speed to normal running speed, spring 17 is compressed so that disc 16 comes into contact with ring 23 and the thrust of governor 13 is transmitted to spring 18, which yields only when the maximum admissible speed of engine 1 is reached.

The displacements of disc 16 are transmitted to rack 12 through a lever 25 pivotally mounted on a journal 26 eccentrically secured to a spindle 27. The arrangement is such that, when spindle 27 rotates in the clockwise direction (FIGS. 2 and 3) rack 12 is moved in the direction corresponding to an increase of the flow rate of the fuel fed to the engine (direction opposed to that of arrow F). Of course the arrangement above described is given merely by way of example.

In order to show the novel feature of the present invention it will be reminded that, usually, the lever 14 of the throttle control acts directly upon journal 26 or upon a mechanical equivalent thereof, the spindle 28 of said lever 14 and spindle 27 being for instance made of a single piece. In this case, to a given position of lever 14 there may correspond a multiplicity of speeds of wheel 5, since a variable ratio of transmissiono exists between engine 1, the speed of which is substantially constant for said position of lever 14, and wheel 5.

Now, according to the present invention, governor 13, and more particularly, in the embodiment shown by the drawings, the spindle 27 of said governor is subjected to the action of a movable part itself subjected to the action of two opposed forces, to wit, on the one hand a resilient force exerted by the engine throttle control and acting to accelerate the engine and, on the other hand a force of opposed direction varying in the same manner as the speed of wheel 5.

According to the embodiment illustrated by the drawings, the movable element in question is a sliding rod 29 connected to spindle 27 through a lever 30 rigid with said spindle and a swivel 31 the seat of which is carried by rod 29. The direction of displacement of rod 29 corresponding to an increase of the flow rate of pump 10 is indicated by the arrow f of FIG. 3.

Rod 29 carries a piston 33 slidable with a liquid-tight fit in a cylinder 34 and this piston 33 is subjected to the action of the two above mentioned forces in the following manner. The spindle 28 of lever 14 carries, fixed with respect thereto, a forked lever 35 bearing against a sliding member 36 carried by rod 29, a spring 37 being inserted between this member 36 and piston 33. The pressure in cylinder 34 on the side of piston 33 opposed to spring 37 varies in the same manner as the speed of wheel 5.

This pressure is created by pump 38 (FIG. 1) of constant cylinder volume, driven by shaft 9, which collects liquid from reservoir 8 through a pipe 39 and returns this liquid to said reservoir through a pipe 40 provided with a throttled portion 41. The liquid under pressure flows through a shunt pipe $40_a$ branching off from pipe 40 upstream of throttled portion 41. Cylinder 34 contains a spring 43 urging piston 33 in the same direction as the pressure existing in said cylinder. An abutment screw 44 in cylinder 34 limits the displacements of piston 33 toward the right.

Of course, instead of a sliding piston 33, use might be made of a flexible diaphragm mounted in cylinder 34 to operate rod 29, spring 37 bearing on said diaphragm in any suitable manner.

The power plant above described works as follows:

When the ratio of transmission determined by pump 2 and receiver 4 does not vary, governor 13 works as follows:

When engine 1 is idling, wheel 5 is in fixed position, this result being obtained in any suitable manner. For instance pump 2 rotates with a zero flow rate. Or a shunt conduit is opened between pipes 6 and 7. Or again a clutch is interposed between engine 1 and pump 2 and is then in the nontransmitting position. Lever 14 is at rest against abutment $42_a$. Spring 43 keeps journal 26 in the idling position. The spring 17 of governor 13 is then the only element to act in the regulating system.

Under normal running conditions, lever 14 pushes piston 33 toward the right in FIG. 3, through spring 37, which causes journal 26 to pivot in the direction corresponding to an increase of the flow rate of pump 10 (rack 12 moved toward the right in FIG. 2).

If the speed of wheel 5 is constant, the pressure existing in cylinder 34 is also constant and rod 29 remains in balanced position for a given position of lever 14. Governor 13 is brought into play only if the speed of the engine tends to exceed the maximum admissible value.

If, on the contrary, for a given position of lever 14, the speed of wheel 5 changes, increases for instance, this causes the pressure in cylinder 34 to increase and moves piston 33 toward the left in FIG. 3. As a consequence of this, journal 26 is rotated in the direction corresponding to a reduction of the flow rate of pump 10 and causes a slowing down of engine 1 and of wheel 5 and consequently a drop of the pressure in cylinder 34. Rod 29 is thus given at any time a position such that to any position given to lever 14 there corresponds substantially a given speed, and only one speed, of wheel 5.

Screw 42 permits adjusting the maximum speed of the vehicle and screw 44 the maximum flow rate of injection pump 10.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What we claim:

1. A power plant for driving a rotating driven part controlled by a driver which comprises, in combination, an internal combustion engine having an output shaft, means, including a governor device, for controlling the feed of fuel to said engine, a variable ratio transmission interposed between said output shaft and said part, a control member operative by the driver, a movable element operatively connected with said governor device, means operative in response to variations of the speed of said driven part for exerting on said movable element a force varying together with, and in the same direction as, the speed of said driven part to displace said element in the direction that reduces said fuel feed when the speed of said driven part increases, and means interposed between said control member and said movable element for exerting on said movable element a resilient force opposed to the above mentioned force in response to a displacement of said control member in the direction tending to accelerate said engine, said two last mentioned means being arranged in such manner that, for a given position of said control member, the variations of speed of said driven part which tend to take place under the action of said variable ratio transmission are automatically reduced by corresponding variations of the speed of the engine due to the action of said governor device under the effect of said first mentioned force.

2. A power plant for driving a rotating driven part controlled by a driver which comprises, in combination, an internal combustion engine having an output shaft, means for controlling the feed of fuel to said engine, a governor device operatively connected with said means for control thereof as a function of the speed of said engine, a variable ratio transmission interposed between said output shaft and said part, a control member operative by the driver, a sliding rod operatively connected with said fuel feed control means, a piston rigid with said sliding rod, a fixed cylinder arranged to cooperate with said piston, to define therewith a variable volume chamber so that sliding displacements of said rod in the direction that increases the volume of said chamber cause a reduction of the rate of fuel feed to said engine whereas sliding displacements in the opposed direction cause an increase of the rate of fuel feed to said engine, a liquid tank, a pump having its input in communication with said tank and its output in communication with said variable volume chamber, means for coupling said pump with said driven part so as to exert on said sliding rod a force in the first mentioned direction varying together with, and in the same direction as, the speed of said driven part and spring means interposed between said control member and said sliding rod for exerting on said rod a resilient force opposed to the above mentioned force in response to a displacement of said control member in the direction tending to accelerate said engine.

References Cited in the file of this patent

UNITED STATES PATENTS

| | | |
|---|---|---|
| 2,393,882 | Blair | Jan. 29, 1946 |
| 2,972,224 | Forster | Feb. 21, 1961 |
| 3,036,426 | Brueder | May 29, 1962 |
| 3,093,946 | Pitt et al. | June 18, 1963 |